Feb. 10, 1925.
J. H. STULL
CLUTCH
Filed Jan. 2, 1924
1,525,673
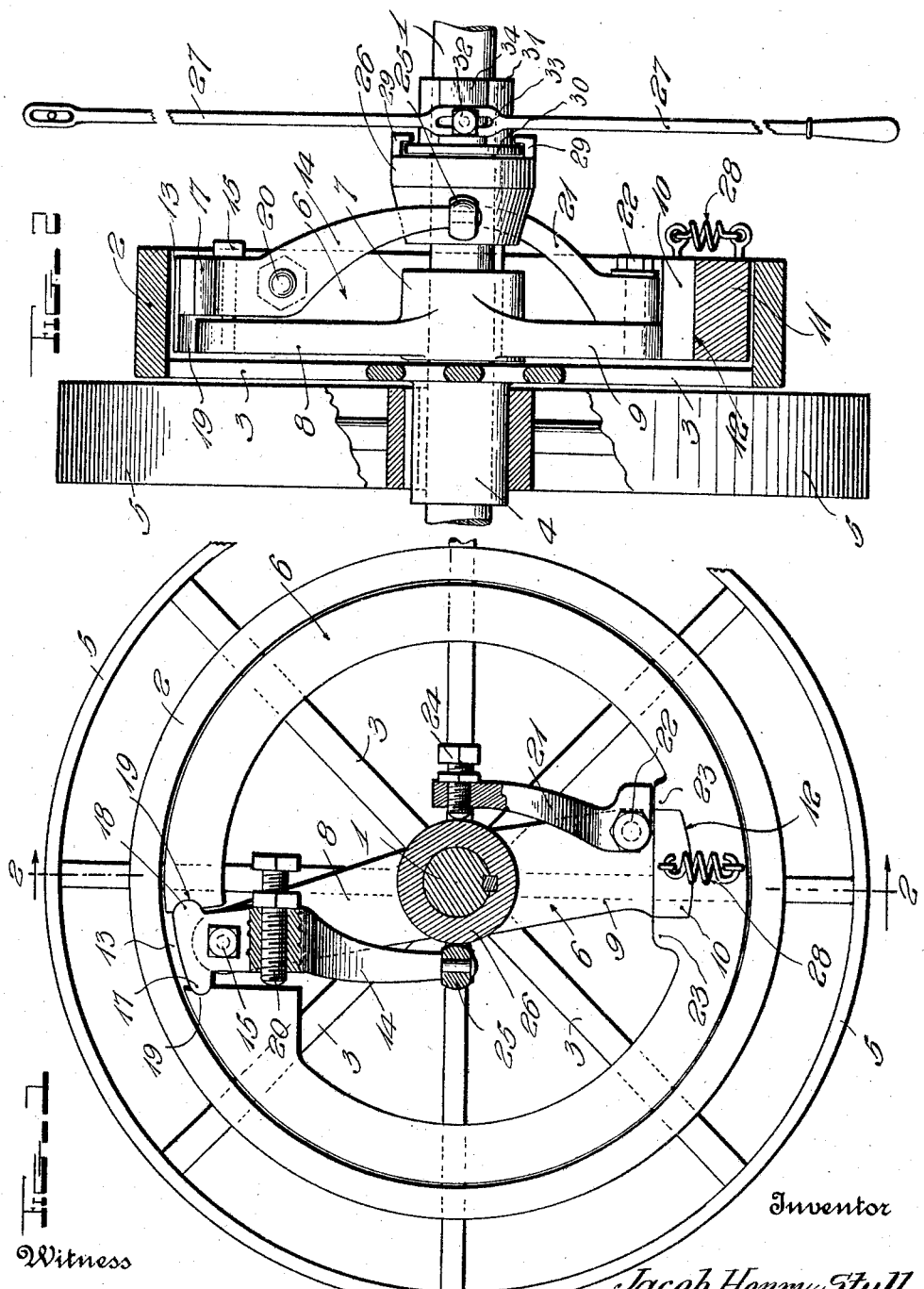
Inventor
Jacob Henry Stull
By *H. B. Wilson & Co.*
Attorneys
Witness Patented Feb. 10, 1925.

1,525,673

UNITED STATES PATENT OFFICE.

JACOB HENRY STULL, OF FREMONT, OHIO.

CLUTCH.

Application filed January 2, 1924. Serial No. 684,010.

*To all whom it may concern:*

Be it known that I, JACOB HENRY STULL, a citizen of the United States, residing at Fremont, in the county of Sandusky and State of Ohio, have invented certain new and useful Improvements in Clutches; and I do declare the following to be a full, clear, and exact description of the invention, such as will enable others skilled in the art to which it appertains to make and use the same.

My invention relates to clutches of the type in which a friction ring is expanded within a relatively rotatable rim, and the object of the invention is to provide a simple and inexpensive clutch of this type, which will effect a uniform contact of the expansible ring with the rim and will entirely free said ring of contact with the rim, when desired.

With the foregoing in view, the invention resides in the novel subject matter hereinafter described and claimed, the description being supplemented by the accompanying drawing.

Figure 1 is a vertical transverse sectional view partly in elevation.

Figure 2 is a vertical sectional view on line 2—2 of Fig. 1.

In the drawing above briefly described, I have illustrated a shaft 1 which in the present instance, is to be rotated, although it will be understood that said shaft might in some instances be a driving shaft instead of a driven shaft. Surrounding the shaft 1 and rotatable with respect thereto, is a rim 2 which is illustrated as having a plurality of spokes 3 extending to a hub 4 which is loose upon the shaft 1. A driving pulley 5 has been illustrated, keyed upon the hub 4, but in some instances, the periphery of the rim 2 may be used instead of said pulley and if desired a supplemental rim may be cast around the rim 2 or otherwise secured to the latter, to engage a belt.

Within the confines of the rim 2, I have illustrated a rotor 6 which preferably consists of a hub 7 keyed upon the shaft 1, and two diametrically opposed radial arms 8 and 9 respectively, the arm 9 being shown as provided with a lateral foot 10 at its outer end.

Within the rim 2, a friction ring 11 has been shown, said ring being preferably of the one-piece, transversely split, self-contracting type disclosed. I have shown this ring provided at its inner side with a socket 12 which receives the foot 10, so that slight radial sliding may take place. The arm 8 extends into the split 13 of the ring 11 and means is mounted upon said arm 8 to expand said ring, while additional means is mounted upon the arm 9 to force radially outward upon said ring, at a point substantially midway between its ends. Thus, uniform contact of the ring with the rim is insured and consequently no undue lateral stress is exerted on the shaft or any bearings of the clutch, tending to wear them to oval form.

In the preferred form of construction, the expanding means for the ring 11 comprises a lever 14 loosely fulcrumed at 15 upon the outer end of the arm 8, the outer end of said lever having lobes 17 and 18 engaging grooves 19 in the opposed end walls of the ring 11, when this ring is contracted. A set-screw 20, threaded through the lever 14, contacts with the end of the ring 11 opposite the end with which the lobe 18 contacts and hence when said lever is rocked in the proper direction, the lobe forces in one direction on one end of the ring and the screw 20 forces in the other direction on the other end thereof. Simultaneously with this operation, the intermediate portion of the ring is forced outwardly by the means above referred to, which preferably comprises a bell crank lever 21 fulcrumed at 22 upon the arm 9, said lever 21 being shown in operative relation with one of a pair of transverse ribs 23 on the ring 11, which ribs define the socket 12. The inner end of the lever 21 is disposed at one side of the shaft 1 and is provided with an adjusting screw 24 while the inner end of the lever 14 is at the other side of said shaft and is preferably equipped with a roller 25. This screw and roller co-operate with a sliding cone 26 which may be operated by any suitable means such as a lever 27. When the cone is forced inwardly, the levers 14 and 21 are operated to simultaneously expand the ring 11 and force the intermediate portion of the latter outwardly against the rim 2. When the cone is retracted, the ring 11 is self-contracting and the intermediate portion of this ring is prevented from then coming in contact with the rim 2, by a coiled spring or other elastic connection 28 connecting said ring with the arm 9.

It is preferable, in connecting the cone or expander 26 with the lever 27, to provide the outer end of said cone or expander with integral hooks 29 which embrace a continuous flange 30 on one end of a sleeve 31 which is loose on the shaft 1, said lever being connected to said sleeve by a cap screw or other pivot 32 passing through a slot 33 or other opening in the lever. The sleeve 31 is preferably flattened as indicated at 34 for contact with the lever to prevent any turning of said sleeve with respect to the lever and consequent canting of the pivot 32 in the slot 33.

As excellent results are obtainable from the details disclosed, they are preferably followed, but within the scope of the invention as claimed, numerous changes may be made.

I claim:

1. A clutch comprising a rim and a rotor relatively rotatable, said rotor having a pair of oppositely extending radial arms, a one-piece transversely split self-contracting friction ring within said rim having an inwardly opening socket opposite its split, said socket slidably receiving the outer end of one of said arms, a spring connection between said one arm and said ring to normally draw the latter inwardly away from the rim, a lever fulcrumed on said one arm for bearing radially outward on said ring at a point adjacent said one arm, a ring expanding lever fulcrumed on the other arm of the rotor and extending into the split of the ring, said ring expanding lever engaging said ring at opposite sides of said split, and a slidable cone co-axial with the rotor and ring, said cone engaging both of the aforesaid levers for operating the same.

2. A clutch comprising a rim and a rotor relatively rotatable, a one-piece self-contracting friction ring within said rim having a transverse split provided with substantially radial walls having opposed shallow sockets, said ring being provided with an inwardly facing socket substantially opposite its split, a driving member carried by a rotor and received in said socket in a manner to permit slight radial movement of the ring at this point, a coiled tension spring connecting said driving member and said ring to draw the latter inwardly away from the rim when the clutch is thrown out, a ring-expanding lever fulcrumed to said rotor adjacent the split of said ring and on an axis parallel with the rotor axis, the outer end of said lever extending into said split and having a pair of opposite rounded lobes which are received in said shallow sockets when the clutch is thrown out, said lobes, shallow sockets and said coil spring then holding the ring against displacement under the action of centrifugal force, a thrust member carried by said lever in inwardly spaced relation with its fulcrum and contacting with one of the aforesaid side walls of said split to co-act with the lobe at the other side wall of the split, for expanding the ring when the lever is rocked, and means for so rocking said lever.

3. A clutch comprising a rim and a rotor relatively rotatable, a one-piece self-contracting friction ring within said rotor, said ring having a transverse split whose opposed walls are formed with shallow sockets near the outer periphery of the ring, a driving connection between said ring and said rotor at a point opposite the split of the ring, said connection permitting inward and outward movement of the intermediate portion of the ring with respect to the rotor, a coiled tension spring connecting the rotor and the intermediate portion of the ring and serving to draw said ring inwardly away from the rim when the clutch is thrown out, a lever fulcrumed on said rotor adjacent the aforesaid split and on an axis parallel with the rotor axis, said lever having opposed lobes on its outer end spaced outwardly from its fulcrum and received in said shallow sockets when the clutch is thrown out, said lobes and sockets and the aforesaid spring then serving to prevent displacement of the ring within the rim by centrifugal force, a thrust member carried by said lever in inwardly spaced relation with its fulcrum and contacting with the side wall of the split opposite the wall engaged by one of the aforesaid lobes, and means for operating said lever.

4. A clutch comprising a rim and a rotor relatively rotatable, said rotor consisting of a hub having a pair of oppositely projecting integral arms, one of which is provided with a laterally extending end parallel with the rotor axis, a one-piece self-contracting friction ring within said rim provided on its inner periphery with a pair of transverse ribs between which said laterally projecting end of said one arm is received to establish a driving connection between the rotor and ring, said connection permitting inward and outward movement of said ring with respect to said arm end, a coiled tension spring connecting said lateral arm end with the adjacent portion of the ring and serving to draw the latter inwardly away from the rim when the clutch is thrown out, an angular lever fulcrumed on said one arm between its lateral end and the hub, one end of said lever engaging one of the aforesaid ribs to force outwardly thereon and crowd the ring toward the rim, the other end of said lever being disposed in outwardly spaced relation with the axis of the rotor; the aforesaid ring being provided with a split opposite the above named transverse ribs, said split having spaced opposed walls formed with shallow sockets adjacent the periphery of the ring, a second lever fulcrumed adjacent its outer end to the other arm of the rotor and having rounded lobes in outwardly spaced relation with its fulcrum, said lobes being received in said shallow sockets when the clutch is thrown out, a thrust member carried by said second lever in inwardly spaced relation with its fulcrum and contacting with the side wall of the ring split, opposite the wall engaged by one of the aforesaid lobes, the inner end of said second lever being spaced outwardly from the rotor axis, and a slidable collar co-axial with the rotor for operating both the first and the second named levers.

In testimony whereof I have hereunto affixed my signature.

JACOB HENRY STULL.